United States Patent [19]

Medley, III

[11] Patent Number: 4,695,377

[45] Date of Patent: Sep. 22, 1987

[54] FLUID FILTER HAVING SEPARABLE ELEMENTS

[76] Inventor: Frank W. Medley, III, 45 E. 10th St., Cookesville, Tenn. 38501

[21] Appl. No.: 899,924

[22] Filed: Aug. 25, 1986

[51] Int. Cl.⁴ .............................................. B01D 27/08
[52] U.S. Cl. ................................... 210/132; 210/340; 210/440
[58] Field of Search ............... 210/DIG. 13, 130, 132, 210/340, 341, 323.2, 335, 440, 443

[56] References Cited

U.S. PATENT DOCUMENTS

| | | | |
|---|---|---|---|
| 2,098,725 | 11/1937 | Hurn | 210/131 |
| 2,318,276 | 5/1943 | Worthington | 210/90 |
| 3,344,923 | 10/1967 | Pall et al. | 210/90 |
| 3,390,778 | 7/1968 | Uhen | 210/314 |
| 3,552,553 | 1/1971 | Reading | 210/484 |
| 3,586,171 | 6/1971 | Offer | 210/136 |
| 3,975,273 | 8/1976 | Shaltz | 210/74 |
| 4,272,371 | 6/1981 | Moses | 210/168 |
| 4,640,772 | 2/1987 | Graham | 210/DIG. 13 |

*Primary Examiner*—Frank Spear
*Attorney, Agent, or Firm*—Luedeka & Neely

[57] ABSTRACT

An oil filter attaches to an internal combustion engine and filters the oil that is circulated through the engine. The filter includes a first can and a second can that may be attached together or separated apart. The first can attaches to the engine, and it has a first inlet and a first outlet for receiving oil from and transmitting oil to the engine. It also has a second inlet and a second outlet for receiving oil from and transmitting oil to the second can. The second can sealably attaches and detaches from the first can and, when attached, the second outlet of the first can is connected to an inlet of the second can, and an outlet of the second can is sealably connected to the second inlet of the first can. Filters are disposed within the two cans and flow directing apparatus is provided to direct the oil from the engine, through the two filters in series and back to the engine.

11 Claims, 3 Drawing Figures

FLUID FILTER HAVING SEPARABLE ELEMENTS

FIELD OF INVENTION

The present invention relates to fluid filters and particularly relates to an oil filter made up of two elements that may be detached one from the other.

BACKGROUND AND SUMMARY OF INVENTION

In many internal combustion engines it is desirable to filter the engine oil with two different types of filters, a full flow filter and a partial flow filter. The full flow filter is series connected to the oil circuit of the engine so that all of the oil circulating through the engine passes through the full flow filter, while the partial flow filter is connected to the oil circuit so that it receives a portion of the oil flowing through the engine. Typically, the partial flow filter is connected in parallel with a bypass device that carries a portion of the oil around the partial flow filter, and since the partial flow filter is not required to filter the full oil flow, it is usually designed to filter smaller particles from the oil as compared to a full flow filter.

At present, full flow and partial flow filters in an internal combustion engine are usually installed as separate filters which requires separate mounting systems and separate plumbing to invade the oil circuit of the engine in two different places. In some internal combustion engines it is difficult to provide sufficient space for two separate filters, and the hardware and labor needed to mount the second filter adds expense to the engine.

While present systems for providing full flow and partial flow filters are adequate, it would be preferred to use a single filter that would equal the performance of the two filter system. To achieve this goal, the present invention provides a filtering system in which two filters are detachably attached together and function as a single unit requiring only one mounting system on the engine. In a preferred mode, one of the filters would be a full flow filter, and the other would be a partial flow filter.

In accordance with the present invention, an oil filter is provided for attachment to an engine filter base having an engine outlet for transmitting oil under pressure to the filter and having an engine inlet for receiving oil from the filter. The filter includes a first can defining a first filter chamber having first and second ends. A first inlet receives oil into the first end of the first can, and a first outlet transmits oil from the first end of the first can. A second inlet receives oil into the second end of the first can, and a second outlet transmits oil from the second end of the first can. A second filter can defines a second filter chamber and includes a third inlet and a third outlet for receiving oil into and transmitting oil from the second can. First attachment apparatus is provided for detachably attaching the first end of the first can to the engine filter base and for sealably interconnecting the engine outlet with the first inlet and the engine inlet with the first outlet of the first can. A second attachment apparatus is provided for detachably attaching the second can to the second end of the first can and for sealably interconnecting the second outlet to the third inlet and the second inlet to the third outlet. First and second filter elements are disposed, respectively, in the first and second cans and a first flow directing device directs the oil flow in the first can from the first inlet to the second outlet and from the second inlet to the first outlet. This first flow directing apparatus is operable to direct at least some of the oil flow through the first filter element as the oil flows through the first can. A second flow directing means directs oil flow within the second can from the third inlet, at least partially through the second filter element and to the third outlet. In this construction, a single filter is constructed of two separable cans containing filter elements, either of which may be a full flow or a partial flow filter.

The oil filter of the present invention offers the performance and separation of two separate filters, a full flow filter and a partial flow filter, and yet it has the convenience and engine mounting simplicity of a single filter. The separability of the two filter cans allows a user to replace or clean the individual filter cans at different times and results in a more versatile overall filter. This separability also enables the convenient use of a permanent filter element in one can and a disposable filter element in the other can, if desired. For example, a truck engine will be operated in many different environments and the filter will be required to remove different quantities of particulates and water depending upon the environment. If few particulates are encountered in the oil, but the water content of the oil is high, the partial flow filter, which is usually designed to remove the water, may need changing more frequently. However, if the oil contains many large particles, but little water, the opposite result may occur, and the full flow filter must be changed more frequently. The separability of the two filter cans of the present invention allows either of the filters to be replaced or cleaned as needed.

The present oil filter also offers human engineering advantages. While the filter handles and fits the engine as a single filter, the owner can see that he has two filter cans, representing two filters to the owner, and he can easily take them apart. Since the filters are positioned in a side-by-side engaging relationship within the engine compartment, they will be exposed to the same environment and a visual inspection of the side-by-side filters will normally enable one to determine which filter was most recently installed. It is easy for the owner to visually inspect to insure that a mechanic has replaced the correct one of the filters. Thus, while the separability of the two filter cans provides functional advantages from a purely mechanical viewpoint, it also provides psychological or human engineering advantages.

While the invention in its preferred form has been described above as an oil filter for a truck, it will be understood that this filter can be used in a wide variety of fluid filtering applications.

BRIEF DESCRIPTION OF THE DRAWINGS

The present invention may best be understood by reference to the following Detailed Description of Preferred Embodiments when considered in conjunction with the drawings in which.

DETAILED DESCRIPTION

Figure 1:
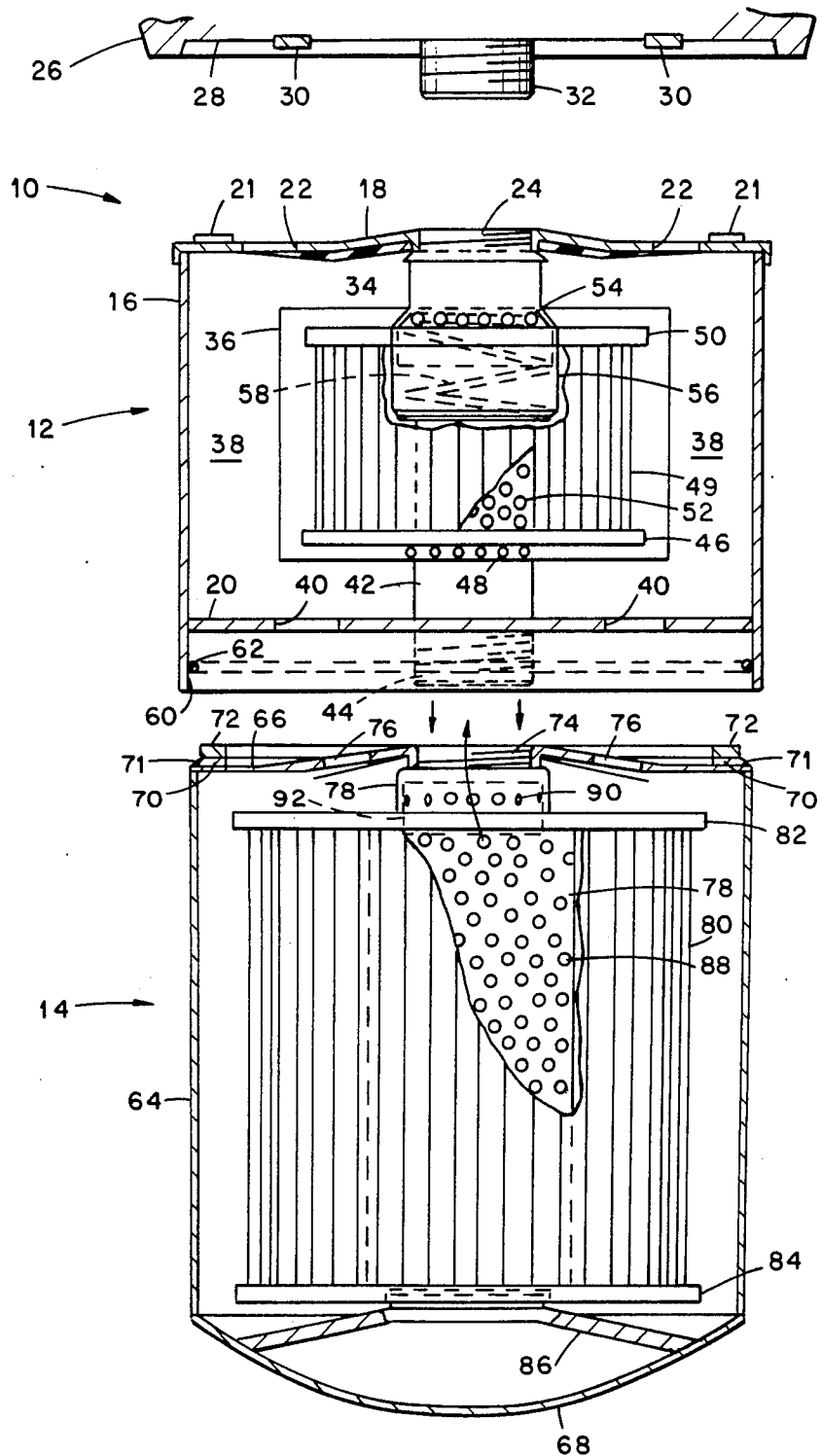
FIG. 1 is a somewhat diagrammatical cross-sectional view of a filter having two filter cans threadedly attached together that function as one filter and constitute one from of the present invention.

Referring now to the drawings in which like reference characters designate like or corresponding parts throughout the several views, there is shown in FIG. 1, a filter 10 embodying one form of the present invention. The filter 10 includes a first filter can 12 and a second filter can 14 that may be threadely attached together, but in FIG. 1 they are shown spaced apart and in position for being screwed together.

The first can 12 is constructed with cylindrical sidewalls 16 with an upper end plate 18 mounted on one end of the cylindrical wall 16 and a lower end plate 20 mounted within the cylinder of the cylindrical wall 16 and proximate to the lower end of the cylindrical wall 16. Both of the end plates 18 and 20 are circular in shape and are dimensioned to mate with the cylindrical sidewalls.

A cylindrical sealing ring 20 is mounted on the outside face of the upper end plate 18 adjacent to the perimeter of the plate, and a plurality of inlet parts 22 are formed in the upper plate 18 at positions inwardly from the sealing ring 21. A threaded aperture 24 is formed in the center of plate 18. This aperture 24 constitutes an oil outlet for the can 12 and it also functions to threadedly secure the first can 12 to an internal combustion engine or another source of oil.

To illustrate how the first can 12 is connected to a source of oil, an engine oil filter base 26 is shown immediately above the can 12. This base includes a cylindrical mounting face 28, preferably circular in shape, and a threaded nipple 32 extending outwardly from the center of the mounting face 28. Oil outlet ports 30 are disposed concentrically around the nipple 32, and nipple also functions as an oil inlet.

The first can 12 is threadedly secured to the engine filter base by inserting the nipple 32 into the threaded aperture 24 and rotating the can 12 until the sealing ring 20 engages the face 28 of the engine filter base 26. It will be appreciated that the oil outlet ports 30 are positioned so that they will be disposed inwardly from the sealing ring 21 when the first can 12 is attached to the filter base 26. Thus, the sealing ring 21 forms a seal around the oil outlet ports 30 and the inlet ports 22 of the first can 12. A washer or other sealing means is provided so that the threaded interconnection between nipple 32 and threaded aperture 24 forms a seal as well. In this configuration, oil may flow out of the engine through oil port 30 and into the first can 12 through the oil inlet ports 22. Also, oil flows from the first can 12 back to the engine base 26 by flowing through and out of the threaded aperture 24 and into the threaded nipple 32.

A tube 34 extends downwardly from the threaded aperture 24 into the can 12 where an interior can 36 is mounted on the tube 34 within the can 12. The volume defined between the cylindrical sidewalls 16 and the interior can 36 constitutes a cylindrical passageway 38, and outlet ports 40 are formed in the lower and plate 20 so that oil may flow into the can 12 through the inlet ports 22, through the passageway 38 and through the outlet ports 40. A second tube 42 is concentrically disposed within the can 12 and extends through the center of the plate 20. The outer end of the tube 42 is threaded and forms a threaded nipple 44 which will hereinafter be described in greater detail. The second tube 42 extends into the can 36 and terminates at a lower plate 46. Apertures 48 are formed in the tube 42 within the interior can 36 so that oil may flow from the tube 42 out of the apertures 48 and around the lower plate 46. A radial flow filter element 48 is mounted between the lower plate 46 and against an upper plate 50. The upper tube 34 extends downwardly through the upper plate 50 and terminates at the lower plate 46, and apertures 52 are formed in the tube 34 at positions between the upper and lower plates 46 and 50. Thus, oil may flow radially from the interior of can 36, through the radial flow filter element 49 and into the tube 34 through the apertures 52. The oil flowing into the tube 34 will then exit the first can through the threaded aperture 24 and the threaded nipple 32.

Apertures 54 are also formed in the tube 34 above the upper plate 50 but still within the interior can 36. These apertures are normally closed by a bypass valve 56 that is mounted within the can 36 on the tube 54. A spring 58 controls the bypass valve 56 so that it is normally closed and blocks the flow of oil through the apertures 54. However, if the oil pressure within the can 36 relative to the oil pressure within the tube 34 exceeds a predetermined amount, the bypass filter will open and allow oil to flow from the interior of the can 36 through the apertures 54 and into the tube 34. Under these conditions, the bypass valve 56 will maintain a predetermined pressure drop between the interior of the can 36 and the interior of the tube 34 so that at least a portion of the oil may continue to flow through the filter element 48 and into the tube 34. In this construction, the filter element 49 may be chosen to filter fine particles and it need not be required to carry the full flow of the oil that is being circulated through the engine. Also, the bypass valve 56 performs a safety function in that it will allow oil to bypass the filter element 49 in the event that it becomes completely clogged.

Referring to the lower portion of the first can 12, it will be appreciated that a sleeve portion 60 is formed by the cylindrical walls 16 at a position below the lower end plate 20. Mounted within the sleeve portion 60 is an O-ring 62 that helps form the seal with the second can 14. Located immediately below the first can, there is shown in FIG. 1, a second can 14 that includes cylindrical sidewalls 64 an upper end plate 66 covering the top end of the cylindrical sidewall 64 and a curved lower endplate 68 closing the bottom end of the cylindrical sidewall 64. The upper plate 66 includes a flange 70 that extends around the periphery of the plate 66 and has a curved annular recess 71 formed therein for receiving the O-ring 62. When the second can 14 is mounted on the first can 12, it fits within the sleeve portion 60 and the O-ring 62 is received into the recess 71 and forms a seal between the flange 70 and the interior of the sleeve portion 62. An annular sealing ring 72 is also mounted on the top of the flange 70 and it functions to engage and seal against the lower surface of the plate 20.

At the center of the plate 66 is a threaded aperture 74 that is dimensioned to receive the threaded nipple 44. This arrangement is essentially identical to the threaded aperture 24 and threaded nipple 32. Again, a washer or similar sealing device is used to form a seal between the threaded aperture 74 and nipple 44.

Disposed between the threaded aperture 74 and the sealing ring 72 are inlet ports 76 formed in the plate 66. These ports 76 allow oil to enter the second can 44 from the outlet ports 40 that are formed in plate 20 of the first can 12. A central tube 78 extends downwardly into the second can 14 and a filter 80 is mounted on the tube 78. The filter 80 includes an upper plate 82 and a lower plate 84 with the filter media extending therebetween. The tube 78 extends through the upper plate 82 and terminates at the lower plate 84, and a bracket 86 is provided for supporting the lower plate 84 on the curved plate 68. Apertures 88 are formed in the tube 78 as it passes through the filter 80 so that oil may flow from the outside of the filter 80 through the filter and into the apertures 88. Apertures 90 are formed in the tube 78 above the upper plate 82 and these apertures are controlled by a bypass valve 92 that is essentially identical to the valve 56. The function of bypass valve 92 is to allow oil to escape from the second can 14 if the filter 80 is completely clogged.

Referring now to the top portion of FIG. 1, in operation, oil flows from the engine through ports 30 in the oil filter base 26 and into the first can 12 through the inlet ports 22. The oil then flows through the passageway 80, around the interior can 34, and out of the first can 12 through the outlet ports 40. The oil from ports 40 enters the second can 14 through inlet ports 76 and then flows around the upper plate 82 and through the filter 80 and the apertures 88 into the center tube 78. The filtered oil exits the second can 14 through the threaded aperture 74 and the threaded nipple 44 and enters the tube 42. This filtered oil exits the tube 42 through apertures 48 and flows around the lower plate 56 and into and through the filter 48 and the apertures 52. After the oil flows through the apertures 52, it has entered the tube 34 and it exits the second can 12 through the threaded aperture 24 and threaded nipple 32 as it returns to the engine filter base 26. An alternate route for the oil to follow within the interior can 36 is through the bypass valve 56. If for any reason the full flow of the oil cannot pass through the filter 48, the oil pressure differential between the interior of the can 36 and the interior of the tube 34 will rise to the point that the bypass valve 56 will open and allow at least some of the oil to pass through the apertures 54. In like manner, when the pressure differential between the interior of the second can 14 and the interior of the tube 42 rises to a predetermined level, the bypass valve 92 will open and allow oil to flow from the interior of the can 14 through the apertures 90 and into the tube 42.

While radial flow filters have been shown in the embodiment illustrated in FIG. 1, it will be understood that numerous different types of filters may be used. For example, axial flow filters could be mounted in one or both of cans 12 to 14. Likewise, it is preferred, but not necessary, that the oil be filtered in the second can 14 prior to being filtered in the first can 12. Also, in the above description, the terms "upper" and "lower" were used only in reference to the position of structure as shown in the drawings. The filter 10 could assume any orientation in use.

Figure 2:
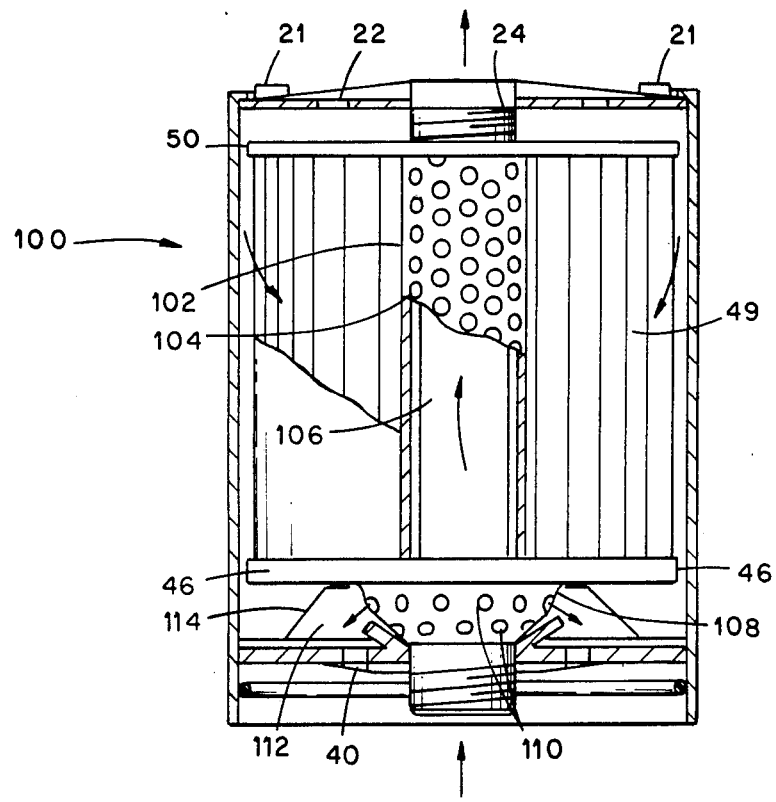
FIG. 2 is a diagrammatical cross-sectional view of an alternate embodiment illustrating a different oil flow path through two filter cans.

In FIG. 2, there is shown a filter can 100 that can be substituted for the first filter can 12 shown in FIG. 1. Can 100 is constructed similarly to can 12 in terms of outward appearance. However, internally, the oil within can 100 flows through filter 48 before it is delivered to the second can 14. In the can 100 there is no interior can 36 and the oil is allowed to enter can 100 through the ports 22 and immediately flow through the filter 48. At the center of the filter 48 there is a tube 102 having a plurality of apertures 104 formed therein. A second tube 106 is disposed coaxially within the tube 102 and the oil flowing through the apertures 104 is received into the volume defined between the two tubes 102 and 106. Tube 102 terminates and is sealed against the upper plate 50 but it extends through the lower plate 46. The inner tube 106 extends through and is sealed against both plates 50 and 46. The oil flowing through tube 102 enters a receptacle 108 having a plurality of apertures 110 formed therein, the oil flows through the receptacle 108 and 110 aperture into an annular chamber 112 defined by walls 114, and then the oil flows out of the outlet ports 40 and is available to be filtered by the second can 14.

Figure 3:
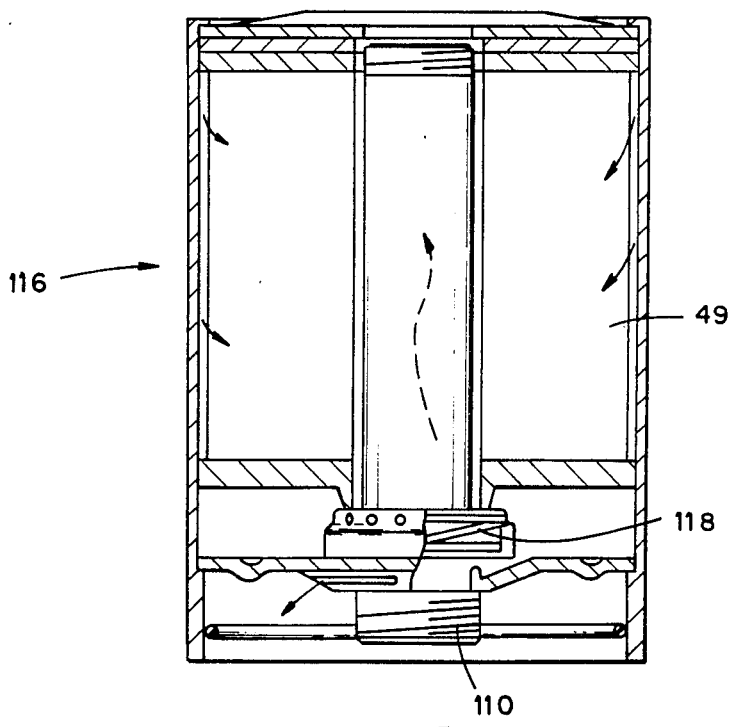
FIG. 3 is another cross-sectional view of an alternate embodiment similar to that shown in FIG. 2 and having an additional bypass valve.

FIG. 3 illustrates a filter can 116 that is essentially identical to that of filter can 100. except that a bypass valve 118 is disposed at the bottom of the can. This bypass valve 118 allows the oil to flow directly to the second can, such as can 14, without flowing through the filter 48 when a predetermined pressure differential exists between the interior of the can 116 and the interior of the tube 110. The bypass valve 118 is a safety measure in that it will allow the oil to flow out of the can 116 even when the filter 48 is completely clogged and it also allows the use of a partial flow filter within can 116 if desired.

Although particular embodiments have been described in the foregoing detailed description, it will be understood that the invention is capable of numerous rearrangements, modifications and substitutions of parts without departing from the scope of the invention as defined in the following claims.

Of the embodiments described above, filter 10 is preferred, and it is prefered to provide a partial flow in can 12 and a full flow filter in can 10. However, in all of the embodiments, two cans are separable and, as described above, this structure results in significant mechanical and human engineering advantages.

What is claimed is:

1. A fluid filter for attachment to a filter base having a base outlet for transmitting fluid under pressure to the filter and having a base inlet for receiving fluid from the filter, comprising:

a first can defining a first filter chamber and having first and second ends;
first inlet means for receiving fluid into the first end of said first can;
first outlet means for transmitting fluid from the first end of said first can;
second inlet means for receiving fluid into the second end of said first can;
second outlet means for transmitting fluid from the second end of said first can;
at least a second can defining a second filter chamber;
third inlet means formed in said second can for receiving fluid into said second can;
third outlet means formed in said second can for transmitting fluid from said second can;
first attachment means for detachably attaching the first end of said first can to the filter base and for sealably interconnecting the base outlet with said first inlet means of said first can and the base inlet with said first outlet of said first can;
second attachment means for detachably attaching said second can to the second end of said first can and for sealably interconnecting said second outlet to said third inlet and said second inlet to said third outlet;
first and second filter elements disposed, respectively, in said first and second cans;

first flow directing means for directing fluid flow in said first can from said first inlet to said second outlet and from said second inlet to said first outlet, said first flow directing means being operable to direct at least some fluid flow through said first filter element as fluid flows through said first can;

second flow directing means for directing fluid flow in said second can from said third inlet, at least partially through said second filter element, and to said third outlet, whereby fluid will flow from the filter base through said first and second filter elements and back to the filter base.

2. The fluid filter of claim 1 further comprising fluid flow bypass means for bypassing at least part of the fluid around at least one of said first and second filter elements.

3. The fluid filter of claim 1 further comprising bypass valve means disposed in said first can for bypassing fluid around said first filter element when the fluid pressure within said first can operating on said bypass valve means exceeds a predetermined pressure.

4. The fluid filter of claim 1 further comprising bypass valve means disposed in said second can for bypassing fluid around said second filter element when the fluid pressure within the second can operating on said bypass valve means exceeds a predetermined pressure.

5. The fluid filter of claim 1 wherein said first filter element is a partial flow filter and said second filter element is a full flow filter.

6. The fluid filter of claim 1 wherein said first filter element is a full flow filter and said second filter element is a bypass filter.

7. The fluid filter of claim 1 wherein:
said first attachment means comprises a first threaded nipple extending from said filter base and a first threaded aperture in said first end of said first can for threadedly receiving said threaded nipple; and
said second attachment means comprises a second threaded nipple extending from the second end of said first can and a second threaded aperture in said second can for threadly receiving said second threaded nipple.

8. The fluid filter of claim 1 wherein:
said first attachment means comprises a first threaded nipple extending from said filter base, a first threaded aperture in said first end of said first can for threadedly receiving said first threaded nipple, and at least a first sealing ring concentrically disposed with respect to said first aperture for forming an annular seal between the filter base and said first end of said first can; and
said second attachment means comprises a second threaded nipple extending from said second end of said first can, a second threaded aperture in said second can for receiving said second threaded nipple, and at least a second sealing ring concentrically disposed with respect to said second aperture for forming a seal between said first and second cans.

9. The fluid filter of claim 1 wherein said first filter element and said first flow directing means further comprise a partial flow filter and a bypass valve for bypassing at least some flow around said partial flow filter when the fluid pressure operating on said bypass valve exceeds a predetermined pressure;

10. The fluid filter of claim 1 wherein said second filter element comprises a full flow radial flow filter.

11. An oil filter for attachment to an engine oil filter base having a threaded engine nipple, an annular seal base, an engine outlet disposed between said threaded nipple and said annular seal base for transmitting oil under pressure to the filter, and an engine inlet disposed within said nipple for receiving oil from said filter, comprising:
a first can having an upper end plate;
a threaded aperture disposed in said upper end plate for receiving and sealing with said engine nipple;
seal ring means disposed on said upper end plate for sealingly engaging the annular seal base when said threaded nipple is threaded onto said engine nipple;
a first oil inlet formed in said upper end plate between said aperture and seal ring means;
said threaded aperture defining a first oil outlet;
a lower end plate formed on said first can;
a lower annular seal base formed on said lower end plate;
a lower threaded nipple extending from said lower end plate and being concentrically disposed with respect to said lower annular seal base;
a second oil outlet disposed in said lower end plate between said lower nipple and said lower annular seal base;
a second oil inlet disposed within and defined by said lower threaded nipple;
outer oil passage means for transmitting oil from said first oil inlet to said second oil outlet;
inner oil passageway means for transmitting oil from said second oil inlet to said first oil outlet;
first oil filter means disposed in one of said inner and outer oil passageway means for filtering oil as it passes therethrough;
a second can having a connection plate;
a second threaded aperture disposed in said connection plate for receiving and sealing with said lower nipple;
second annular seal ring means disposed on said connection plate for sealingly engaging said lower annular seal base when said lower nipple is threaded onto said second threaded aperture;
a third oil inlet formed in said second can;
said second threaded aperture defining a third oil outlet;
third oil passageway means for transmitting oil from said third oil inlet through said second can to said third oil outlet; and
second oil filter means disposed in said third oil passage means for filtering oil flowing therethrough.

* * * * *